United States Patent [19]

Lipinski

[11] 4,212,288
[45] Jul. 15, 1980

[54] WINDOW-MOUNTED SOLAR HEATING AND HUMIDIFYING DEVICE

[76] Inventor: Vincent B. Lipinski, P.O. Box 41, Chaska, Minn. 55318

[21] Appl. No.: 913,509

[22] Filed: Jun. 7, 1978

[51] Int. Cl.$^2$ .................................................F24J 3.02
[52] U.S. Cl. ................................... 126/428; 126/432; 126/450
[58] Field of Search ............... 126/270, 271, 400, 428, 126/432, 450; 237/1 A; 60/641; 165/48, 49, 104 M, 104 S

[56] References Cited

U.S. PATENT DOCUMENTS

| | | | |
|---|---|---|---|
| 246,626 | 9/1881 | Morse | 126/270 |
| 3,832,853 | 9/1974 | Butler, Jr. | 60/641 |
| 3,832,992 | 9/1974 | Trombe et al. | 237/1 A |
| 3,875,925 | 4/1975 | Johnston | 126/270 |
| 3,952,947 | 4/1976 | Saunders | 237/1 A |
| 4,068,652 | 1/1978 | Worthington | 237/1 A |

FOREIGN PATENT DOCUMENTS

| | | | |
|---|---|---|---|
| 2306410 | 10/1976 | France | 126/270 |
| 2347628 | 11/1977 | France | 126/270 |

*Primary Examiner*—James C. Yeung
*Attorney, Agent, or Firm*—Williamson, Bains, Moore & Hansen

[57] ABSTRACT

A solar heating and humidifying device for use with a building wall having a window therein is attached to the wall and extends from above the window to the ground where the edges of the outer housing are buried. The outer housing is formed of a transparent plastic and is of multiple layers to provide an insulating effect. A heat storing frame conforms generally to the shape of the outer housing and extends from ground level to just beneath the window, and the frame is covered with a heat absorbing material such as black canvas. An air flow controlling baffle is located above the frame and at the bottom of the window so as to control the exit flow of heated air from the heating chamber located thereebeneath. An air filter and inlet valve is located near the bottom of the heating chamber for intake of outside air into the chamber.

7 Claims, 5 Drawing Figures

U.S. Patent    Jul. 15, 1980    4,212,288
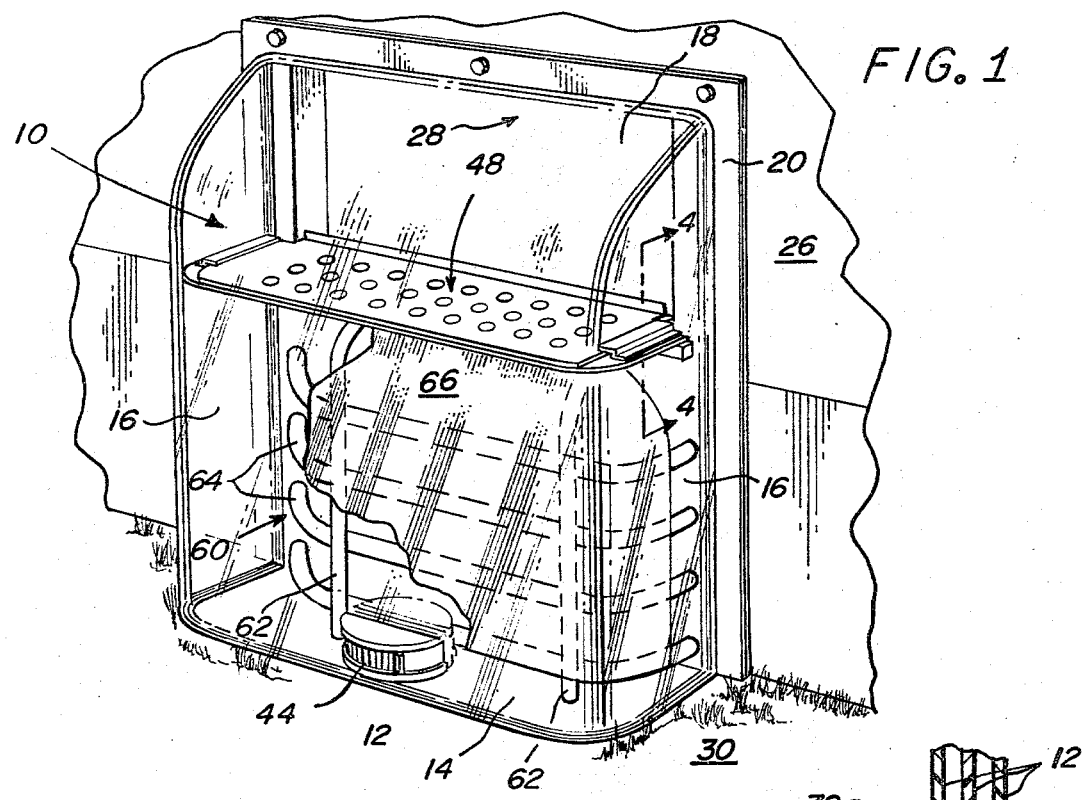
FIG. 1
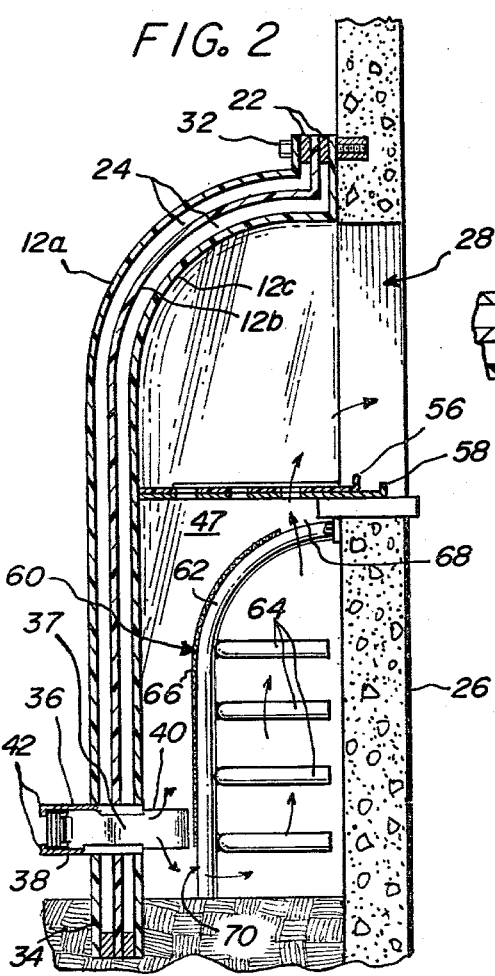
FIG. 2
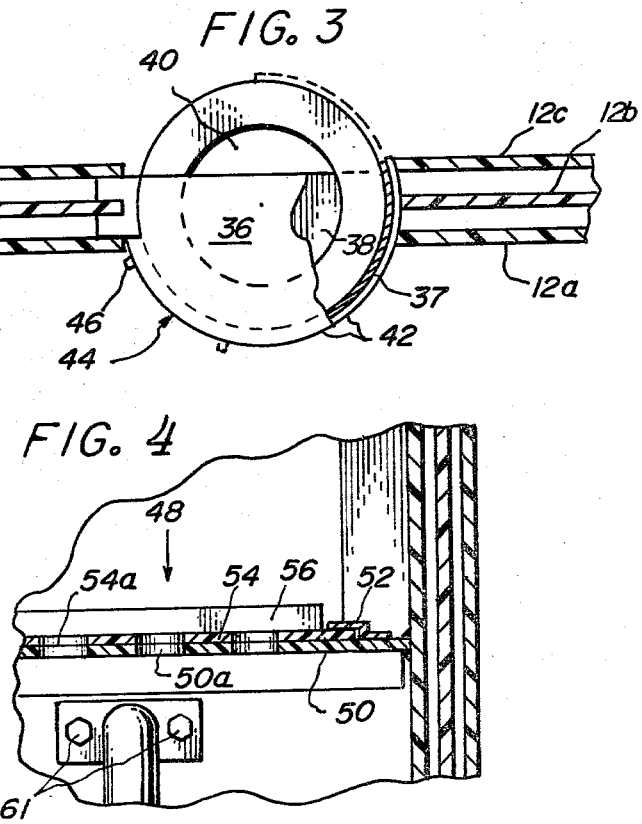
FIG. 5
FIG. 3
FIG. 4

WINDOW-MOUNTED SOLAR HEATING AND HUMIDIFYING DEVICE

BACKGROUND OF THE INVENTION

In view of the recent rise in energy prices for conventional sources, there has arisen a need for the provision of alternate energy sources for various purposes. Solar power has been viewed as one answer to this problem in that there is no fuel cost associated with operation.

There has developed a need for a way in which outbuildings of various sorts may be heated at a minimum of operating expense. Such buildings are often not provided with heat or even power.

In particular, various devices have been proposed for heating and insulating a building by way of windows preexisting therein. Such prior art devices range from simple plastic bubbles over the windows to a number of more complicated devices. In particular devices such as those shown in U.S. Pat. Nos. 4,023,306, 3,946,522, 3,319,378 and 3,148,479 disclose plastic window greenhouses which have some heating effect but do not appear to be designed particularly for that purpose. Various solar heaters such as those proposed in U.S. Pat. Nos. 246,626 and 3,964,678 have been proposed but are not well suited for use in conjunction with windows since they block the view. Such devices are also unduly complicated and expensive to manufacture. The aforementioned devices also do not provide the desired degree of efficiency or controlability of result obtainable with the instant device. Further, none of the aforementioned devices include provision for humidifying the incoming heated air.

SUMMARY OF THE INVENTION

The device of the instant invention is particularly suited for heating outbuildings or the like which often do not have energy sources of their own yet may benefit by a nominal degree of heating in conjunction with an insulating effect and humidification.

A thermo-formed outer housing having several spaced layers is provided with an open back and bottom for attachment to the wall of a building having a window therein. The bottom of the housing is buried in the ground adjacent the building wall to provide an enclosed heating chamber. An air intake near the bottom of the outer housing is provided with a filter therein having an adjustable damper thereover for regulating the incoming flow of air through the filter and into the heating chamber. The heating chamber is defined by a space beneath the window and located therein is an energy storing framework of tubing having located thereon a solar energy absorbing material such as black canvas or the like. Located above the framework and beneath the opening of the window is an adjustable baffle to regulate the flow of air out of the heating chamber through the window and into the area to be heated. The baffle is formed by two sliding plates having perforations which are in one position coextensive with each other so that air may flow through the perforations and such that the plates may be moved relative to each other so as to shut off the flow of air therethrough. The air filter at the inlet has the desired effect, even when the damper is fully open, of essentially preventing outward flow of air from the heating chamber due to the fact that any pressure build-up inside the chamber will cause the heat to rise out the upper baffle and into the area to be heated. Thus the restriction placed in the air intake is desirable from a standpoint of efficiency.

BRIEF DESCRIPTION OF THE DRAWINGS

FIG. 1 is a perspective view of the invention as applied to the wall of a building.

FIG. 2 is a sectional view taken along lines 2—2 of FIG. 1.

FIG. 3 is a sectional view taken along lines 3—3 of FIG. 1.

FIG. 4 is a sectional view taken along lines 4—4 of FIG. 1.

FIG. 5 is a view showing attachment of the optional housing extension.

DESCRIPTION OF THE PREFERRED EMBODIMENT

Referring now to the drawings and in particular FIG. 1, the solar heating humidifying device, generally 10, is comprised of an outer transparent housing 12 having a front wall 14, side walls 16 and a curved top wall 18. Housing 12 is desirably thermally formed of a clear plastic, but of course other constructions may be used. The device 10 is designed to be attached to a wall such as that shown at 26 having a window 28 therein which is spaced above the ground 30. Housing 12 is formed with a peripheral flange 20 thereabouts on three sides which may be mounted to building wall 26 by means of bolts 32.

Ideally housing 12 is comprised of a plurality of layers such as those shown in FIG. 2 at 12A, 12B and 12C. The multiple layers provide an insulating effect while retaining the effectiveness of the device for heating. The layers are spaced apart by spacers 22, which may either be molded integrally with the various aforementioned layers or provided as separate pieces.

The bottom 34 of housing 12 is buried several inches in the ground 30 to prevent air leakage thereunder which has the further advantage of requiring no separately molded bottom which would otherwise require extra material and expense. A pair of semicircular lips 36 and 38 are molded into the front wall 14 near the bottom of housing 12. These lips project perpendicular to front wall 14 and bound an opening 40 in which is placed a standard automotive type cartridge air filter 41. A pair of tracks 42 are molded in arcuate segments 36 and 38 and face inwardly towards opening 40 to therein retain an arcuate shaped closure and damper member 44 therebetween. Damper member 44 may be moved as shown particularly in FIG. 3 from its open to close position by means of a tab or handle 46 and may be rotated as shown in FIG. 3 from an open to closed position.

An upper baffle 48 shown particularly in FIG. 4 is formed of two pieces. A bottom baffle member 50 is formed integrally with or attached to housing 12 and is situated in a horizontal plane. Two parallel opposing tracks 52 are provided on the upper surface of bottom plate 50 for slidably retaining and locating upper baffle plate 54 having rear handle lip 56 thereon to aid in the movement of the upper baffle plate. A plurality of apertures 50A are located in lower baffle plate 50. A corresponding number, size and location of apertures 54A are provided in upper baffle plate 54 such that when upper plate 54 is positioned relative to lower plate 50 as shown in FIG. 2 particularly, air will be free to pass through apertures 50A and 54A to enter window 28. The location and size of the apertures is such that when upper plate 54 is slid toward wall 26 as shown in FIG. 2, the apertures will become non-coextensive thereby restricting the flow of air therethrough until at the limit provided by lip 56 against lip 58 of lower baffle panel 50 the apertures are completely non-coextensive thereby completely shutting off the flow of air therethrough.

An energy absorbing frame 60 is preferably formed of tubing and may comprise two vertical members 62 attached by welding, bolting or other conventional means to a plurality of horizontal members 64, the frame conforming to the shape shown in FIG. 1, that being generally the shape of the outer housing only smaller such that the front of framework 60 is spaced slightly inwardly from the housing 12. Framework 60 may be bolted to the wall by means of bolt(s) 61 or alternatively may merely be leaned against the wall if so desired. A piece of energy and moisture absorbing material 66 is fastened to framework 60 and material 66 is preferably made of black canvas or the like. Such material then will absorb solar energy radiant thereon and transfer the heat into the energy storing framework 60. The top of energy absorbing material 66 is spaced from the wall 26 thereby forming an aperture 68 through which heated air from behind the material may rise for passage through baffle 48. Also the bottom of material 66 is spaced from the ground 30 as shown particularly in FIG. 2 forming a further aperture 70 through which air to be heated may flow as shown by the arrows in FIG. 2.

As noted previously the invention is best suited for use in heating outbuildings, basements and the like where a great deal of energy expense is not desired but where a passive heating system will be sufficient to raise the temperature the desired amount. (Less than required for habitation)

In conjunction then it is desirable that the instant invention be adaptable toward variously located windows and toward this end if the device is molded in one size, use with windows placed more than a certain distance above the ground will cause the bottom end of outer housing 12 to be spaced above the ground. As shown in FIG. 5, to solve this problem, an extension 72 similar in construction to housing 12 may be provided and attached using curved lips 72A to interlock with by means of adhesives, sealants or the like with the bottom edge of transparent housing 12 in order to provide the desired extension to ground 30.

In operation, solar rays will pass through outer housing 12 and impinge upon the absorbent material 66 located on framework 60 thereby heating the material which in turn will transfer heat to the framework as well as the air in heating chamber 47. When a desired heat level is reached, upon the air becoming heated, it will tend to rise and be restrained against exit by baffle 48. Upon temperature in the heating chamber 47 reaching the desired level the baffle 48 is opened by grasping lip 56 as shown in FIG. 2 and moving upper baffle plate 54 toward the position shown in FIG. 2. Generally the fully opened position shown in FIG. 2 will tend to result in the air exiting the heating chamber 47 before the desired heating effect has fully taken place. Therefore it is necessary to modulate the escape rate of the heated air from the heating chamber 47 by placing the baffle 48 in an intermediate position so that air exiting will be of the proper temperature.

Upon the sun going behind the clouds or upon nightfall, the substantial heat-storage capacity of framework 60 will tend to continue to heat the air for a substantial period of time after solar input has halted.

The device of the instant invention is particularly suited for humidification of the air during heating. In order to utilize the device for humidification, all the user need do is reach through window 28 and pour water downwardly through open baffle 48 so as to soak the energy absorbent canvas 66. The passage of heated air past the soaked canvas will tend to humidify the heated air in an efficient manner. Also, further water poured into the device will tend to be soaked up by ground 30 inside housing 12 and will further contribute to humidification by passage of the air over the moisture-laden earth. Thus the open bottom acts not only to conserve materials in construction but also to aid in the humidification process. The use of canvas results in an effective energy absorbing material which at the same time has the ability to contribute to the humidification process.

It is to be noted that filter 37 contributes to the efficient operation of the device by in effect placing a flow restriction in the path of incoming unheated air. When closure 44 is open, were filter 37 not in place, heated air inside heating chamber 47 would have a tendency to flow outwardly through opening 40 thereby wasting the heat gained. By placing a suitable restriction in opening 40, not only is the incoming air filtered but the filter also serves to prevent outward flow of heated air. In operation, the only pressure gradient that will develop across filter 37 of any magnitude will be caused by the rising of heated air through heating chamber 47 and upwardly through baffle 48 which will in turn draw air inwardly through filter 37 to be heated. On the other hand, a high pressure will not tend to develop inside the heating chamber which would force the heated air outwards.

During times when the heating effect is not desired, door 44 may be closed by moving the door to the position shown in solid lines in FIG. 3. When it is desired to use the device, door 44 is moved to the position shown in phantom in FIG. 3 by means of handle 46. Also, baffle 48 is moved to the closed position.

Of course, it can be appreciated that if desired, the inventive device can be utilized in conjunction with several windows in a wall or even a whole building wall for an enhanced yet economical heating effect.

While the preferred embodiments of the present invention have been described, it should be understood that various changes, adaptations and modifications may be made therein without departing from the spirit of the invention and the scope of the appended claims.

What is claimed is:

1. A solar heating and humidifying device for heating a building through a window, the device comprising:

a transparent housing having an open back and bottom for attachment to a building wall having a window therein such that said back covers a portion of the wall including the window and said open bottom covers and encloses a portion of the ground adjacent the building, means adjacent said bottom for regulating and restricting the intake of air into said housing, said means comprising, an automotive type cylindrical air filter having an outer circumference, a portion of said circumference being exposed to the outside air, and said inlet regulating means comprises an arcuate door located adjacent said circumference and circumferentially slidable thereover between a first position uncovering said portion and allowing air flow through said filter and a second position covering said portion thereby preventing flow through said filter, a heat-storing framework substantially conforming in shape to said housing and located within said housing, a heat and moisture absorbing material located on said framework in heat-transferring relation thereto, means adjacent the upper end of said housing for regulating the outlet flow of heated and moisturized air out of said housing and through the window.

2. The solar heating and humidifying device of claim 1 wherein said housing comprises at least two spaced layers of transparent material to form an insulating construction.

3. The solar heating and humidifying device of claim 1 wherein said heat and moisture absorbing material is comprised of a dark fabric.

4. The solar heating and humidifying device of claim 1 wherein said heat-storing framework comprises a plurality of tubing members.

5. The solar heating and humidifying device of claim 1 wherein said dark fabric comprises black canvas.

6. The solar heating and humidifying device of claim 5 wherein said baffle comprises first and second planar pieces, each of said pieces having a plurality of apertures therein, said first piece being fixed relative to said housing and said second piece being slidable relative to said first piece, the location of the apertures in each piece being such that when second piece is in a first position, said apertures in said first and second pieces are aligned so as to allow passage of air therethrough, and a second position whereby said apertures are non-coextensive thereby preventing air flow through said baffle.

7. The solar heating and humidifying device of claim 1 wherein said outlet regulating means comprises an adjustable horizontal baffle located above said framework and attached to said housing.

* * * * *